United States Patent [19]

Foster

[11] Patent Number: 4,471,086

[45] Date of Patent: Sep. 11, 1984

[54] HOT-MELT ADHESIVES FOR MEAT PACKAGING AND OTHER LOW TEMPERATURE APPLICATIONS

[75] Inventor: Bruce W. Foster, Longview, Tex.

[73] Assignee: Eastman Kodak Company, Rochester, N.Y.

[21] Appl. No.: 550,169

[22] Filed: Nov. 9, 1983

[51] Int. Cl.$^3$ ............ C08L 21/06; C08L 21/08; C08L 91/05; C08L 93/04

[52] U.S. Cl. .................... 524/489; 524/487; 524/271; 524/272

[58] Field of Search ............ 524/487, 489, 490

[56] References Cited

U.S. PATENT DOCUMENTS

| | | | |
|---|---|---|---|
| 3,243,395 | 3/1966 | Guillet et al. | 524/489 |
| 3,243,396 | 3/1966 | Hammer | 524/489 |
| 3,280,062 | 10/1966 | Richardson | 524/489 |
| 3,366,589 | 1/1968 | Hammer et al. | 524/489 |
| 3,660,336 | 5/1972 | Gonta et al. | 524/489 |
| 4,070,316 | 1/1978 | Combs et al. | 524/487 |
| 4,127,619 | 11/1978 | Godfrey | 524/487 |
| 4,146,521 | 3/1979 | Godfrey | 524/487 |

*Primary Examiner*—Allan Lieberman
*Attorney, Agent, or Firm*—Clyde L. Tootle; Daniel B. Reece, III

[57] ABSTRACT

The hot-melt adhesives of the present invention comprise a blend of at least one polyethylene, a tackifying resin, a high density, low viscosity polyethylene wax having a molecular weight of about 1000, and a Fischer-Tropsch hydrocarbon wax. This hot-melt adhesive has a novel combination of properties such as low viscosity and fast setting which meet the requirements necessary for use in rapid bonding or closing in low temperature applications.

12 Claims, No Drawings

HOT-MELT ADHESIVES FOR MEAT PACKAGING AND OTHER LOW TEMPERATURE APPLICATIONS

DESCRIPTION

This invention relates to polyethylene containing hot-melt adhesives. One aspect of this invention concerns a polyethylene containing hot-melt adhesive having a novel combination of properties. Another aspect of this invention concerns a polyethylene containing hot-melt adhesive that has good adhesive properties and can be used in rapid bonding or closing low temperature applications.

Hot-melt adhesives are widely used in industry for various applications such as in product assembly. For example, one such application is in the packaging industry in the fabrication of corrugated paperboard and also for use in cardboard case sealing and carton closing operations. The adhesive is generally applied by a hot-melt applicator which consists of a reservoir for the adhesive, heating means for melting the adhesive and maintaining it in a molten state, and means for applying the adhesive for a particular end use.

The rate at which the adhesive can be applied is primarily a function of the melt viscosity of the adhesive, i.e., the lower the viscosity the faster the rate of application. In order to increase production rates it has been in the past necessary to operate at higher temperatures to reduce the melt viscosity of the adhesive. This often degrades the adhesive which is undesirable. The melt viscosity of polyolefin-based hot-melt adhesives is generally higher when compared with ethylene-vinyl acetate copolymer-based hot-melt adhesives. Therefore, this has been one of the major problems in the use of polyolefin-based hot-melt adhesives in competing with other types of hot-melt adhesives. Attempts have been made to correct this problem by lowering the melt viscosity of the polyolefin-based hot-melt adhesive. However, lowering the molecular weight of a polyolefin, such as polyethylene, lowers the melt viscosity, but it also generally substantially reduces the bond strength of an adhesive made from such polyethylene.

Also, polyethylene-based hot-melt adhesives generally have a longer set time (i.e., 10 seconds) than similar ethylene-vinyl acetate copolymer-based adhesives (i.e., about 3 seconds). This relatively long set time greater than about 6 seconds is a disadvantage for use at fast line speeds. For example, a polyethylene-based adhesive useful in sealing cartons at a line speed rate of 22 per minute may not be satisfactory at higher speeds of 44 per minute. Since the packaging industry is continually increasing the speed of operation of their case and carton sealing operations it would therefore be an advance in the state of the art to provide a hot-melt polyethylene containing adhesive having the necessary low melt viscosity and faster set times to be useful in rapid bonding or sealing cartons and having good low temperature properties.

It is, therefore, an object of the present invention to provide a novel hot-melt adhesive.

Another object of this invention is to provide a hot-melt adhesive that has a good balance of properties including both low melt viscosity, fast set time and provides bonds having good low temperature bond properties.

A further object of the present invention is to provide a polyethylene containing low viscosity hot-melt adhesive which can be used in fast setting rapid sealing and bonding operations to provide bonds having good low temperature bond properties.

Another and further object of this invention is to provide a low viscosity adhesive having good low temperature adhesion properties which can be applied at fast line speeds.

In accordance with the present invention, it has been found that a blend comprising at least one polyethylene, a tackifying resin, a high density, low viscosity polyethylene wax having a molecular weight of about 2000 and a synthetic Fischer-Tropsch hydrocarbon wax provides a hot-melt adhesive having a novel combination of properties including low melt viscosity of about 1000 cp. or less at 177° C., fast set times and provides bonds having good low temperature bond quality.

The polyethylenes can be any of the normally solid low density polyethylenes having a melt viscosity of 500 to 20,000 centipoise at 190° C., preferably 1000 to 6000, and a density greater than 0.90 to about 0.945 g./cc. The polyethylenes are prepared by processes well known in the art. For example, polyethylenes with densities up to about 0.945 are prepared by polymerizing ethylene at pressures greater than 500 atmospheres in the presence of peroxide catalysts. Higher density polyethylenes are prepared, for example, in lower pressure processes with the use of Ziegler and Phillips type catalysts. Blends of polyethylenes prepared by the same or different processes can be used.

The polyethylenes can also be modified low density polyethylenes having saponification numbers of about 3 to 60 prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene alone can be used as the polyethylene component or blends of such modified polyethylene with unmodified polyethylene or blends of modified polyethylene and blends of more than one unmodified polyethylene can also be used.

The low density polyethylene or modified low density polyethylenes or blends of such polyethylenes are used in an amount of from about 45% to about 65% by weight, preferably 50% to 60%, of the adhesive formulation. An amount of the polyethylene below about 55% adversely affects the low temperature properties and an amount greater than 65% increases the bond set times greater than 6 seconds.

The tackifying resins useful in the adhesive compositions of this invention have Ring and Ball softening points of about 125° C. to about 135° C. and can be a hydrocarbon resin such as DAC-B hyrocarbon resin prepared according to the process disclosed in U.S. Pat. No. 3,701,760 as well as other hydrocarbon resins, synthetic polyterpenes, rosin esters and the like. One such particularly suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These commercially available hydrocarbon tackifying resins typically exhibit a Ring and Ball softening point of from about 125° C. to about 130° C.; an acid number of from about 0 to 2; a saponification value of less than about 1; and an iodine value of from about 75–100.

Also suitable resins and rosin esters are the terpene polymers having the suitable Ring and Ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 18 percent to about 28 percent by weight of the adhesive composition, preferably about 20 percent to about 25 percent by weight. If the tackifier resin is used in an amount greater than 28 weight percent, the low temperature bond strength is reduced, and an amount less than 18 weight percent gives an increased set time.

The higher density, low viscosity polyethylene waxes useful in this invention are widely available articles of commerce and can be prepared by known techniques. These waxes are made by degrading high density polyethylene to the desired viscosity. Polyethylene waxes normally have, and should have for the present invention, Ring and Ball softening points in the range of 115° to 125° C. and preferably in the range of 118° to 122° C. The wax has a molecular weight of about 1500 to 2500, preferably about 2000, a penetration hardness at 23° C. of about 0.1, and a melt viscosity preferably of about 500 cp. at 150° C.

The Fischer-Tropsch hydrocarbon waxes useful in this invention are widely available articles of commerce and can be prepared by known techniques. These waxes are made by reacting hydrogen and carbon monoxide and are characterized by a high percentage, e.g., over 80%, of normal paraffins. Fischer-Tropsch waxes normally have, and should have for the present invention, DSC melting points in the range of 85° C. to 130° C. and preferably in the range of 85° C. to 120° C. and a crystallization point of about 90° C. and 70° C. The wax has a molecular weight of about 600 to 800, preferably about 750, a penetration hardness at 23° C. of about 1.5, and a melt viscosity preferably of about 10 to 4 cp. at 149° C. and about 8 to 2 cp. at 177° C. Such waxes are sold under various trade names such as Paraflint wax sold by Moore and Munger.

In order to provide the novel combination of properties of low viscosity, fast set times and good low temperature properties it is necessary that the adhesive formulation contain both the high density polyethylene wax and the Fischer-Tropsch hydrocarbon wax in a ratio of about ⅓ to 1/1 by weight respectively. A ratio of less than ⅓ adversely affects the low temperature properties and a ratio of greater than 1/1 increases the set time and increases the viscosity of the adhesive which adversely affects the machinability of the adhesive. The combined total wax content of the adhesive is about 16 to 24% by weight. If the amount of combined wax is less than 16% by weight the set time is increased and an amount greater than about 24% by weight adversely affects the low temperature properties.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene(3,5-di-tert-butyl-4-hydroxyhydrocinnamate)methane](Irganox 1010), lauryl stearyl thiodipropionate (Plastanox 1212), and dilauryl 3,3'-thiodipropionate (Plastanox LTDP) and 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are at least essentially 100 percent solids, have a Thermosel viscosity, Model RVT, in the range of 750 to 4,000 centipoise at 177° C. and a DSC melting point of at least about 90° C., and preferably from about 94° C. to about 105° C.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Low-molecular weight modified polyethylene (179 grams) having a Thermosel viscosity of 3800 cp. at 190° C., density of 0.908 g./cc., and a Ring and Ball softening point of 106° C. and a saponification number of 5, 60 grams of Eastman Resin H-30 hydrocarbon resin tackifier having a density of 1.028 g./cc. at 21° C., melt viscosity of 2150 cp. at 177° C., and Ring and Ball softening point of 129° C., 30 grams of a high density polyethylene wax having a density of 0.947 and having a Ring and Ball softening point of 118° C. and a Brookfield viscosity of 90 at 190° C. and 30 grams of Paraflint RG Fischer-Tropsch wax having a melting point of 94°–99° C. and a melt viscosity of 4.2, 0.3 gram of tetrakis[methylene-3-(3',5'-di-t-butyl-4-hydroxyphenyl)-propionate]methane and 1 gram lauryl stearyl thiodipropionate are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten polymer blend is poured in the form of a thin cake, cooled and chopped into small pieces for use as an adhesive. This composition has a melt viscosity of 1075 cp. at 177° C., a setting point (FTC) of 32° C. The adhesive properties of this material are tested in the following manner using corrugated board and an adhesive tester that simulates a case sealing line.

Corrugated board specimens 4 in. long by 2 in. wide are placed in the grips of the tester. The bottom specimen is cut so that the flutes are parallel to the adhesive bead with the unglazed side being bonded. All top specimens have the flutes perpendicular to the bead with the machine-glazed size being bonded since this is the manner in which a box is bonded in actual practice. The bottom specimen is then moved forward at a constant speed under the melt applicator for the application of the adhesive bead and is stopped directly under the top specimen. After a predetermined open time, the top specimen is moved down to contact the lower specimen. Contact is maintained for a given compression time and force, after which the top substrate is separated from the bottom substrate using a constant cleavage force of 7 pounds. The adhesive bead width (before compression) is adjusted by nitrogen pressure on the hot-melt adhesive applicator to give a width of 70 mils. Ten tests are carried out at each compression time under the following conditions:
Open time — 1.0 sec.
Down pressure — 16–18 psig.
The shortest time required to obtain 80% of the adhesive bonds having adequate bond strengths to provide acceptable bonding is reported as cleavage set time. The cleavage set time for this adhesive is 4 seconds, 80% of the bonded specimens held. The bond quality at 0° C. had fiber tear on 200 psi burst strength corrugated board and partial fiber tear at −18° C.

EXAMPLE 2

Low-molecular weight modified polyethylene (179 grams) of Example 1, 60 grams of Eastman Resin H-130 hydrocarbon resin tackifier of Example 1, 30 grams of Bareco 1000 polywax having a melting point of 94°–99° C. and a melt viscosity of 4.2 at 177° C. and 30 grams of Fischer-Tropsch wax having a melting point of 94°–99° C. and a melt viscosity of 4.2, 0.3 gram of tetrakis[methylene-3-(3′,5′-di-t-butyl-4-hydroxyphenyl)-propionate]methane and 1 gram lauryl stearyl thiodipropionate are placed in a 500 ml. round bottom resin pot fitted with a mechanical stirrer and nitrogen purge line and blended according to the procedure of Example 1. This composition has a melt viscosity of 800 cp. at 177° C., a setting point (FTC) of 32° C. The adhesive properties of this material will be tested in the following manner used in Example 1. The cleavage set time for this adhesive is 8 seconds and the bond quality at 0° C. was fiber tear and at −18° C. the bond quality was partial fiber tear. This example shows that replacing the high density polyethylene wax with the same amount of a different wax, a polywax, provided an adhesive composition which had an increased cleavage set time of 8 seconds or a 100% longer set time even though the adhesive had a low viscosity and good low temperature properties.

EXAMPLE 3

About 179 grams of the modified polyethylene used in Example 1 and 60 grams of Eastman Resin H-130 hydrocarbon resin tackifier, 30 grams of Fischer-Tropsch wax having a melting point of 94°–99° C. and a melt viscosity of 4.2 cp. at 177° C., 30 grams paraffin wax, 0.3 gram of tetrakis[methylene-3-(3′,5′-di-t-butyl-4-hydroxyphenyl)propionate]methane and 1 gram lauryl stearyl thiodipropionate are blended and tested as an adhesive for bonding corrugated board using the procedures described in Example 1. The blend has a melt viscosity at 177° C. of 740 cp., a cleavage set time greater than 10 seconds which is a slow setting adhesive. This example shows that substituting paraffin wax for the high density polyethylene wax of Example 1 provided an adhesive formulation that had unacceptable cleavage set time. Further while the viscosity was low the bond quality was unacceptable because at both −18° C. and 0° C. the bonds only had partial fiber tear.

EXAMPLE 4

About 179 grams of the polyethylene used in Example 1 and 60 grams of Eastman Resin H-130 hydrocarbon resin tackifier, 30 grams of Fischer-Tropsch wax having a melting point of 94°–99° C. and a melt viscosity of 4.2 cp. at 177° C., 30 grams of low density polyethylene wax having a density of 0.921, a Ring and Ball softening point of 108° C. and a Brookfield viscosity of 480 cp. at 125° C., 0.3 gram of tetrakis[methylene-3-(3′,5′-di-t-butyl-4-hydroxyphenyl) propionate]methane and 1 gram lauryl stearyl thiodipropionate are blended and tested as an adhesive for bonding corrugated board using the procedures described in Example 1. The blend has a melt viscosity at 177° C. of 1025 cp., a cleavage set time greater than 10 seconds which is a slow setting adhesive. This example shows that replacing the high density polyethylene wax of Example 1 with a low density polyethylene wax provides an adhesive formulation that has an unacceptable cleavage set time and in addition the bond quality was poor as the adhesive had only partial fiber tear at both −18° C. and 0° C.

EXAMPLE 5

About 179 grams of the polyethylene used in Example 1 and 60 grams of Eastman Resin H-130 hydrocarbon resin tackifier, 60 grams of Fischer-Tropsch wax having a melting point of 94°–99° C. and a melt viscosity of 4.2 cp. at 177° C., 0.3 gram of tetrakis[methylene.3-(3′,5′-di-t-butyl-4-hydroxyphenyl)-propionate]methane and 1 gram lauryl stearyl thiodipropionate are blended and tested as an adhesive for bonding corrugated board using the procedures described in Example 1. The blend has a melt viscosity at 177° C. of 850 cp., and a cleavage set time of only 6 seconds.

In addition the adhesive formulation had poor bond quality as the adhesive had only partial fiber tear at 0° C. and no fiber tear at −18° C.

EXAMPLE 6

About 179 grams of the polyethylene used in Example 1 and 60 grams of Eastman Resin H-130 hydrocarbon resin tackifier, 45 grams of Fischer-Tropsch wax having a melting point of 94°–99° C. and a melt viscosity of 4.2 cp. at 177° C., 15 grams paraffin wax of the high density polyethylene wax of Example 1, 0.3 gram of tetrakis[methylene-3-(3′,5′-di-t-butyl-4-hydroxyphenyl)propionate]methane and about 1 gram lauryl stearyl thiodipropionate are blended and tested as an adhesive for bonding corrugated board using the procedure described in Example 1. The blend has a melt viscosity at 177° C. of 925 cp., a cleavage set time of 4 seconds. The bond quality at 0° C. was good with fiber tear but had no fiber tear at −18° C.

Th invention has been described in detail with particular reference to preferred embodiments thereof, but it will be understood that variations and modifications can be effected within the spirit and scope of the invention.

I claim:

1. A hot-melt adhesive composition having a viscosity of less than 1200 cp. at 177° C. and a cleavage set time of about 6 seconds or less which provides bonds having good low temperature properties comprising a blend of
    (a) about 65 to 45 percent by weight of at least one polyethylene having a melt viscosity of 500 to 20,000 centipoise at 190° C. and a density of greater than 0.90 to about 0.945 g./cc.,
    (b) about 18 to about 28 percent by weight of at least one tackifier resin selected from the group consisting of hydrocarbon resin and polyterpene resins having a Ring and Ball softening point of about 125° C. to about 135° C., and
    (c) about 18 to about 28 percent by weight of a blend of (1) a high density, low viscosity polyethylene wax having a molecular weight of about 800 to 1200 and a Ring and Ball softening point in the range of 110° C. to 120° C. and (2) a Fischer-Tropsch wax having a DSC melting point in the range of 85° C. to 120° C., a molecular weight of about 600 to 800, a penetration hardness of about 1.5 at 23° C. and a melt viscosity of about 10 to 4 cp. at 149° C., wherein said wax blend contains a ratio of high density polyethylene wax to Fischer-Tropsch wax of about 1:1 to 1:3.

2. A hot-melt adhesive composition according to claim 1 wherein said polyethylene is a modified polyethylene having a viscosity of 3800 cp. at 190° C., a density of 0.908 g./cc., a Ring and Ball softening point of 106° C. and a saponification number of 5.

3. A hot-melt adhesive composition according to claim 2 wherein said tackifier resin is a hydrocarbon tackifier resin having a density of 1.028 g./cc. at 21° C., a melt viscosity of 2150 cp. at 177° C., and a Ring and Ball softening point of 130° C.

4. A hot-melt adhesive composition having a viscosity of less than 1200 cp. at 177° C. and a cleavage set time of about 6 seconds or less which provides bonds having good low temperature properties comprising a blend of
    (a) about 60 to 50 percent by weight of at least one polyethylene having a melt viscosity of 500 to 20,000 centipoise at 190° C. and a density of greater than 0.90 to about 0.945 g./cc.,
    (b) about 20 to about 25 percent by weight of at least one tackifier resin selected from the group consisting of hydrocarbon resin and polyterpene resins having a Ring and Ball softening point of about 125° C. to about 135° C., and
    (c) about 20 to about 25 percent by weight of a blend of (1) a high density, low viscosity polyethylene wax having a molecular weight of about 800 to 1200 and a Ring and Ball softening point in the range of 110° C. to 120° C. and (2) a Fischer-Tropsch wax having a DSC melting point in the range of 85° C. to 120° C., a molecular weight of about 600 to 800, a penetration hardness of about 1.5 at 23° C. and a melt viscosity of about 10 to 4 cp. at 149° C., wherein said wax blend contains a ratio of high density polyethylene wax to Fischer-Tropsch wax of about 1:1 to 1:3.

5. A hot-melt adhesive composition according to claim 4 wherein said polyethylene is a modified polyethylene having a viscosity of 3800 cp. at 190° C., a density of 0.908 g./cc., a Ring and Ball softening point of 106° C. and a saponification number of 5.

6. A hot-melt adhesive composition according to claim 5 wherein said tackifier resin is a hydrocarbon tackifier resin having a density of 1.028 g./cc. at 21° C., a melt viscosity of 2150 cp. at 177° C., and a Ring and Ball softening point of 130° C.

7. A hot-melt adhesive composition having a viscosity of less than 1200 cp. at 177° C. and a cleavage set time of about 6 seconds or less which provides bonds having good low temperature properties comprisng a blend of
    (a) about 60 percent by weight of at least one polyethylene having a melt viscosity of 500 to 20,000 centipoise at 190° C. and a density of greater than 0.90 to about 0.945 g./cc.,
    (b) about 20 percent by weight of at least one tackifier resin selected from the group consisting of hydrocarbon resin and polyterpene resins having a Ring and Ball softening point of about 125° C. to about 135° C., and
    (c) about 20 percent by weight of a blend of (1) a high density, low viscosity polyethylene wax having a molecular weight of about 800 to 1200 and a Ring and Ball softening point in the range of 110° C. to 120° C. and (2) a Fischer-Tropsch wax having a DSC melting point in the range of 85° C. to 120° C., a molecular weight of about 600 to 800, a penetration hardness of about 1.5 at 23° C. and a melt viscosity of about 10 to 4 cp. at 149° C., wherein said wax blend contains a ratio of high density polyethylene wax to Fischer-Tropsch wax of about 1:1.

8. A hot-melt adhesive composition according to claim 7 wherein said polyethylene is a modified polyethylene having a viscosity of 3800 cp. at 190° C., a density of 0.908 g./cc., a Ring and Ball softening point of 106° C. and a saponification number of 5.

9. A hot-melt adhesive composition according to claim 8 wherein said tackifier resin is a hydrocarbon tackifier resin having a density of 1.028 g./cc. at 21° C., a melt viscosity of 2150 cp. at 177° C., and a Ring and Ball softening point of 130° C.

10. A hot-melt adhesive composition having a viscosity of less than 1200 cp. at 177° C. and a cleavage set time of about 6 seconds or less which provides bonds having good low temperature properties comprising a blend of
    (a) about 60 percent by weight of at least one polyethylene having a melt viscosity of 500 to 20,000 centipoise at 190° C. and a density of greater than 0.90 to about 0.945 g./cc.,
    (b) about 20 percent by weight of at least one tackifier resin selected from the group consisting of hydrocarbon resin and polyterpene resins having a Ring and Ball softening point of about 125° C. to about 135° C., and
    (c) about 20 percent by weight of a blend of (1) a high density, low viscosity polyethylene wax having a molecular weight of about 800 to 1200 and a Ring and Ball softening point in the range of 110° C. to 120° C. and (2) a Fischer-Tropsch wax having a DSC melting point in the range of 85° C. to 120° C., a molecular weight of about 600 to 800, a penetration hardness of about 1.5 at 23° C. and a melt viscosity of about 10 to 4 cp. at 149° C., wherein said wax blend contains a ratio of high density polyethylene wax to Fischer-Tropsch wax of about 1:3.

11. A hot-melt adhesive composition according to claim 10 wherein said polyethylene is a modified polyethylene having a viscosity of 3800 cp. at 190° C., a density of 0.908 g./cc., a Ring and Ball softening point of 106° C. and a saponification number of 5.

12. A hot-melt adhesive composition according to claim 11 wherein said tackifier resin is a hydrocarbon tackifier resin having a density of 1.028 g./cc. at 21° C., a melt viscosity of 2150 cp. at 177° C., and a Ring and Ball softening point of 130° C.

* * * * *